United States Patent [19]

Suyama

[11] Patent Number: 5,736,821

[45] Date of Patent: Apr. 7, 1998

[54] INTRAPIPE WORK ROBOT APPARATUS AND METHOD OF MEASURING POSITION OF INTRAPIPE WORK ROBOT

[75] Inventor: Kiichi Suyama, Kanagawa, Japan

[73] Assignee: Tokyo Gas Co., Ltd., Tokyo, Japan

[21] Appl. No.: 430,951

[22] Filed: Apr. 28, 1995

[30] Foreign Application Priority Data

Dec. 28, 1992 [JP] Japan .................................. 4-361386
Jun. 18, 1993 [JP] Japan .................................. 5-172232

[51] Int. Cl.⁶ .................................................. H04Q 7/00
[52] U.S. Cl. .................. 318/16; 318/568.22; 343/711; 343/713; 378/60; 324/337
[58] Field of Search ........................... 318/16, 568.12; 343/711, 713; 15/104.3; 378/60; 324/337

[56] References Cited

U.S. PATENT DOCUMENTS 4,706,031  11/1987  Michiguchi et al. .................. 324/337
5,304,899  4/1994  Sasaki et al. ......................... 318/16
5,317,782  6/1994  Matsuura et al. .................. 15/104.3 X

*Primary Examiner*—Karen Masih
*Attorney, Agent, or Firm*—Townsend and Townsend and Crew LLP

[57] ABSTRACT

An intrapipe work robot apparatus includes an intrapipe work robot and an operation unit. The intrapipe work robot is inserted into a pipe so as to perform a work while performing automotive traveling in the pipe. The operation unit designates travel and other actions of the robot externally of the pipe. The operation output signal is transmitted from at least the operation unit to the intrapipe work robot through a radio communicating device having special antenna units.

5 Claims, 4 Drawing Sheets

INTRAPIPE WORK ROBOT APPARATUS AND METHOD OF MEASURING POSITION OF INTRAPIPE WORK ROBOT

BACKGROUND OF THE INVENTION

1. Field of the Invention

The present invention relates to an automotive intrapipe work robot apparatus which travels inside a gas pipe or the like hurled underground to perform a work, e.g., photographing, inside the pipe, and a method of measuring a position of the intrapipe work robot capable of accurately measuring the position in the pipe of the intrapipe work robot from a predetermined position on the ground.

2. Description of Relevant Arts

A gas pipe hurled, e.g., underground is corroded or damaged by the influence of water in the soil or vibration of vehicles traveling on the ground. Then, holes or cracks are sometimes formed in the pipe wall, and foreign matters, e.g., earth and sand, enter the pipe. If a crack is formed in the gas pipe, gas leakage occurs, leading to a catastrophe. Therefore, the gas pipe must be inspected to find corrosion or damage and be repaired before a crack is formed.

To dig down roads and the like for the purpose of inspection requires a high cost and much time. In addition, inspection under or in a building cannot be performed easily. Therefore, recently, an intrapipe work robot type automotive inspecting apparatus that travels inside a gas pipe has been developed, as is disclosed in, e.g., Japanese Patent Laid-Open Documents Nos. 59-147260 and 61-278475.

These official gazettes disclose an inspecting apparatus comprising a traveling mechanism capable of traveling inside a pipe and a photographing unit. This inspecting apparatus is sent into a gas pipe to perform photographing while traveling. The obtained image of the interior of the gas pipe is sent to the ground and subjected to inspection on the ground by a person in charge. Thus, an abnormality in the pipe can be inspected without digging down the ground.

However, a cable is connected to the conventional inspecting apparatus. A control signal from the ground is sent through the cable, and the image photographed by the photographing unit is obtained through the cable. Hence, if the travel distance in the pipe becomes long, the inspecting apparatus must drag a cable having a length equal to the travel distance in the pipe, rendering the entire apparatus very heavy. Where the pipe is bent, the resistance of friction between the cable and the pipe becomes very large. A large driving force is required to cause the inspecting apparatus to travel against the large resistance of friction, leading to an increase in apparatus size. Alternatively, the cable must be shortened to decrease the inspection distance.

Furthermore, in order to send the inspecting apparatus underground, the end portion of the pipe must be exposed to the ground. For this purpose, the ground must be excavated, or part of the wall surface of the building in which the pipe is buried is broken. If the travel distance limit of the inspecting apparatus is short, excavation or boring must be performed at many locations, requiring a cumbersome, costly operation. To perform inspection, a cable to be sent into the pipe must be prepared on the ground in advance. As the inspecting apparatus moves in the pipe, the cable must be supplied or taken up, leading to a very cumbersome operation.

When the intrapipe work robot finds out an abnormality, the location of the abnormality, e.g., corrosion, photographed by the robot must be accurately detected so that an appropriate and quick repair is performed. Therefore, conventionally, a rotary encoder is provided to a wheel of the robot. The moving amount of the robot in the pipe is measured by the rotary encoder through the wheel. The value of the rotary encoder is read to detect the moving amount. Alternatively, the distance of the cable connected to the robot which has been pulled into underground by the robot is measured at the insertion port, thereby grasping a specific part of the pipe at which the robot is currently located.

However, if the rotary encoder is incorporated in a wheel, slippage occurs especially when the wheel moves across a groove, and errors are accumulated in the measured value. Although some robot has a plurality of measuring wheels to cope with this inconvenience, a plurality of data from the respective wheels must be matched and the robot itself needs a sensor. If the position of the robot is measured from the cable connected to the robot, since the cable flexes in the pipe, an accurate distance cannot be measured.

In addition, a plurality of branch pipes each having a relatively small diameter are usually connected at their respective one ends to a main gas pipe, which has a diameter larger than the branch pipes, whose inside should be inspected. Under this condition, when a radio wave is transmitted into the main gas pipe, the radio wave is propagated into these branch pipes also. Accodingly, the radio wave leaks out from the branch pipes and propagates within a gas user's home, because another end of each branch pipe is connected to gas instruments in the gas user's home. As a result, it becomes possible that a radio disturbance or a radio interference is caused to other radio communication instruments such as, for example, a radio set, a TV set, a cordless telephone, etc.

SUMMARY OF THE INVENTION

The present invention has been made in view of the above situation of the prior art technique. It is the first object to provide an automotive intrapipe work robot apparatus which travels in a pipe, e.g., a gas pipe through radio communicating means and which is capable of photographing a state in the pipe throughout a long distance.

It is the second object of the present invention to provide a method capable of measuring the position in the pipe of an intrapipe work robot easily and accurately from a predetermined position on the ground without casusing any radio disturbance or radio interference to other radio communication instruments.

In order to achieve the first object described above, according to the first aspect of the present invention, there is provided an intrapipe work robot apparatus comprising: an intrapipe work robot inserted into a pipe so as to perform a work while performing automotive travelling in the pipe; an operation unit for designating travel and other actions of the robot externally of the pipe, in which an operation output signal is transmitted from at least the operation unit to the intrapipe work robot through radio communicating means; a movable antenna unit mounted on the intrapipe work robot which includes a circular base having an under stay and connected to a rear end of said intrapipe work robot, a first antenna mounted on the base and horizontally extending rearwards so as to receive an operation signal from the operation unit and a second antenna mounted vertically on the stay so as to transmit an image signal; a stationary antenna unit mounted on the ground on the side of said operation unit which includes a first antenna paired with the first antenna of the movable antenna unit so as to transmit the operation signal and mounted horizontally so as to extend forwards, a second antenna paired with the second antenna of the movable antenna unit so as to receive the image signal and mounted vertically, and a measuring unit for measuring a position of the intrapipe work robot.

According to a second aspect of the present invention, there is also provided an intrapipe work robot apparatus set forth in the first aspect of the present invention, wherein the intrapipe work robot comprises a body having an outer diameter with which the body can be inserted into a pipe to be inspected, a travelling mechanism that can travel in forward and backward directions photographing means capable of photographing an interior of the pipe to be inspected, receiving means for receiving an operation output signal from the operation unit on the ground, control means for performing control regarding travel and other actions based on the received operation output signal, and transmitting means for transmitting an image photographed by the photographing means to the operation unit.

According to a third aspect of the present invention, there is provided an intrapipe work robot apparatus set forth in the first aspect, wherein the operation unit comprises a control circuit having input means for designating travel and other actions of the body, transmitting means for transmitting an operation output signal from the control means to the body, and receiving means for receiving the image signal photographed by said photographing means.

According to a third aspect of the present invention, there is provided an intrapipe work robot apparatus set forth in the first aspect, wherein the the circular base of the movable antenna unit is turnably connected to the rear end of the intrapipe work robot, and further a center of gravity of the movable antenna unit is positioned under a turning center of the circular base, so that if the intrapipe work robot is inclined on a left or a right side, a line passing through the turning center and the center of gravity is always kept to a vertical manner.

According to a third aspect of the present invention, there is provided an intrapipe work robot apparatus set forth in the first aspect, wherein the stationary antenna unit further comprises a pair of antennae mounted horizontally and oppositely to each other thereon so as to transmit and receive a robot detecting signal transmitted with a radio wave.

According to sixth aspect of the present invention, there is provided a method of communicating with each other between an operation unit installed on the ground and an intrapipe work robot inserted into a main pipe to be inspected to which a plurality of branch pipes each having a diameter smaller than that of the main pipe are connected, which comprises transmitting, from said operation unit to the intrapipe work robot and vice versa, radio waves each having a frequency equal to or more than a cut-off frequency corresponding to the main pipe, while the frequency is less than a cut-off frequency corresponding to each of the branch pipes.

According to a seventh aspect of the present invention, there is provided a method of measuring a position of an intrapipe work robot at an operation unit installed on the ground, the intrapipe work robot being inserted into a main pipe to be inspected to which a plurality of branch pipes each having a diameter smaller than that of the main pipe are connected, comprising the steps of: transmitting, from the operation unit into the main pipe, a radio wave having a frequency equal to or more than a cut-off frequency corresponding to the main pipe, while the frequency is less than a cut-off frequency corresponding to each of the branch pipes, radiating the radio wave on the intrapipe work robot, receiving the radio wave, reflected by the intrapipe work robot, at the same point as a point from which the radio wave has been transmitted, detecting a time elapsed from transmission of the radio wave till reception thereof, and substituting the lapse time in a predetermined calculation formula, thereby calculating a distance from the point from which the radio wave has been transmitted to the intrapipe work robot.

According to the present invention having the above aspects, an operation output signal sent from the operation unit to the intrapipe work robot, an image one sent from the intrapipe work robot to the operation unit, and the like are transmitted and received in the form of a radio wave. Therefore, the intrapipe work robot need not accompany a cable in the pipe, but can travel a very long distance within the reach of the radio wave and perform works, e.g., to display an image in the pipe. Hence, the work distance of intrapipe inspection and the like can be increased, and the work in the pipe can be performed very quickly and easily. Furthermore, the work outside the pipe, i.e., on the ground is simplified.

It is known that when a radio wave having a predetermined frequency which is determined from the inner diameter of the pipe is transmitted inside the pipe, attenuation in the pipe is small and the radio wave can be transmitted to a distant location without decreasing its intensity. Therefore, if this radio wave is transmitted in the pipe, it can be transmitted to a distant location, and upon reaching the robot located midway along the pipe, the radio wave is reflected by the robot. The reflected radio wave is returned in the pipe and received by the receiver provided at a predetermined position on the ground. When the time interval from transmission to reception is measured and converted to a distance, the distance from the ground unit to the robot can be easily measured.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF PREFERRED EMBODIMENTS

Hereinafter, several preferred embodiments of the present invention will be described with reference to the accompanying drawings.

Figure 1:
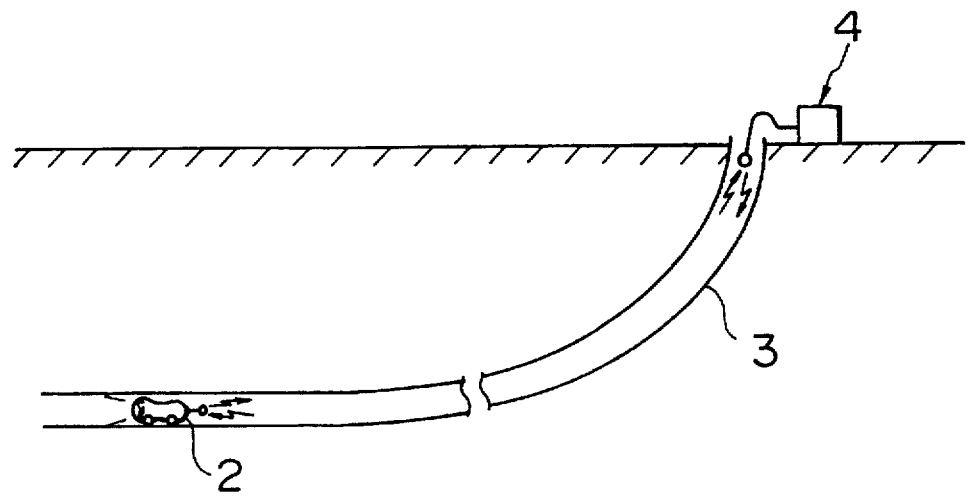
FIG. 1 is a schematic longitudinal sectional view showing an intrapipe work robot apparatus according to the present invention.

FIG. 1 shows the schematic arrangement of an intrapipe work robot apparatus according to the present invention as an intrapipe inspecting apparatus. The intrapipe work robot apparatus is constituted by an automotive intrapipe work robot 2 (merely referred to as a robot hereinafter) that travels in a pipe 3 buried, e.g., underground, and an operation unit 4 installed on the ground for remote-controlling travel and other actions of the robot 2 in the pipe 3. The robot 2 and the operation unit 4 can exchange a signal with each other through a radio communicating means.

Figure 2:
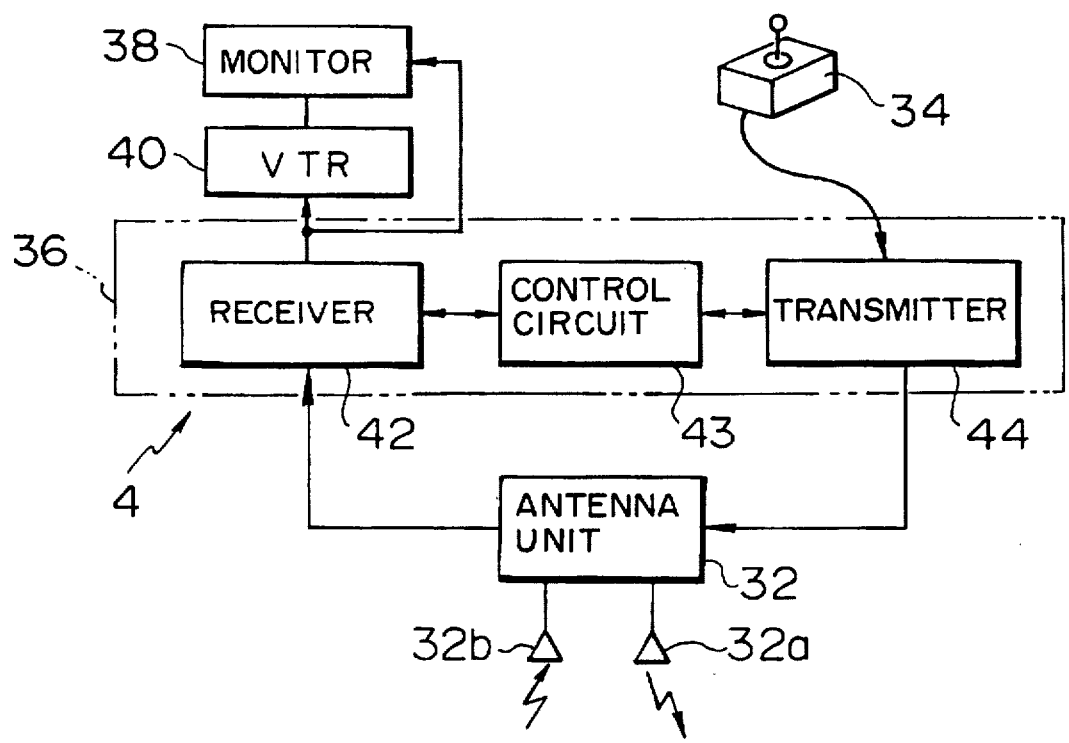
FIG. 2 is a block diagram showing electric components of an operation unit for operating the intrapipe work robot used in the present invention.

As shown in FIG. 2, the operation unit 4 comprises an antenna unit 32 installed on the ground in a stationary manner and having an antenna 32a for transmitting a control signal fed from a transmitter 44 to the robot 2 and an antenna 32b for receiving an image signal fed from the robot 2 to a receiver 42, a command box 34, a controller 36, a monitor 38, a VTR 40, and the like. The command box 34 is an input unit for designating forward movement or backward one, the travel speed, etc., of the robot 2, and is provided with operation switches (not shown). The command box 34 also has operation switches (not shown) for operating actions of a camera 8 provided to the robot 2 and lights 20 (both will be described later). The monitor 38 displays a transmitted image signal of the interior of the pipe photographed by the robot 2. The VTR 40 records this image.

The controller 36 comprises the receiver 42, the transmitter 44, and a control circuit 43 for controlling the receiver 42 and the transmitter 44. The receiver 42 is connected to the monitor 38 and the VTR 40, and the transmitter 44 is duly connected to the command box 34. Through the stationary antenna unit 32 connected to the receiver 42 and the transmitter 44, the transmitter 44 transmits through the antenna 32a the control signal of operation designation sent from the command box 34, and the receiver 42 receives through the antenna 32b the image signal and the like from the robot 2. The received image signal is sent to the monitor 38 and the VTR 40.

Figure 6:
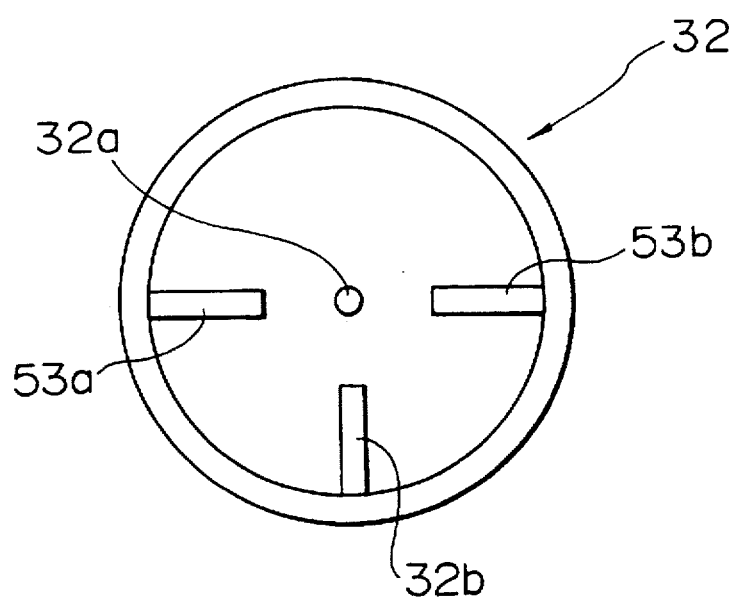
FIG. 6 is a front view of an antenna unit fixedly mounted on an operation unit installed on the ground.

FIG. 6 shows an embodiment of the stationary antenna unit 32 in which the antenna 32a is mounted horizontally so as to extend forwards and, on the other hand, the antenna 32b is mounted vertically.

Figure 3A:
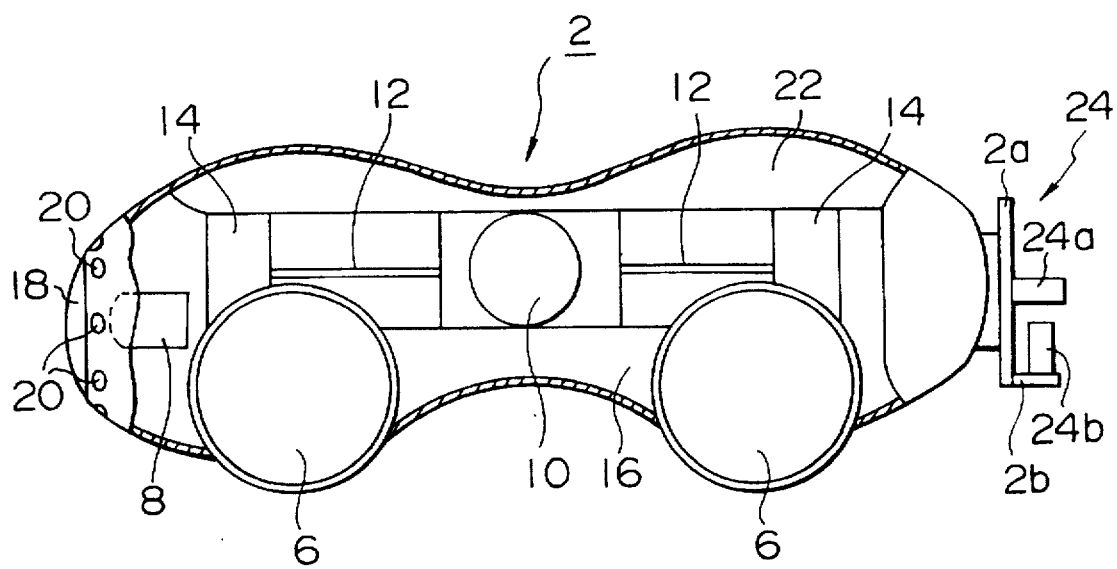
FIG. 3A is a schematic block illustration showing respective components of the intrapipe work robot.

FIG. 3A shows the robot 2. The robot 2 is of a cocoon-like shape with a recessed central portion and has wheels 6 at four lower portions. The robot 2 further has the camera 8 in its front portion, a DC brush-less motor 10 at its central portion, and a movable antenna unit 24 at its rear portion.

The camera 8 is mounted with its photographing direction facing ahead. A transparent protection cover 18 is mounted on the front surface of the camera 8 to protect it. The illumination lights 20 are installed around the protection cover 18.

Gear boxes 14 coupled to the wheels 6 are provided in front of and in the rear portion of the motor 10. A drive shaft 12 of the motor 10 meshes with the respective gear boxes 14. Hence, rotation of the motor 10 is adjusted to rotate the wheels 6. Each of the wheels 6 has magnetism on its outer circumferential surface. When the robot 2 travels in a pipe made of a magnetic material, e.g., iron, the wheels 6 are attracted to the inner surface of the pipe, so that the robot 2 can reliably travel without slippage even if the pipe is tilted.

Figure 4:
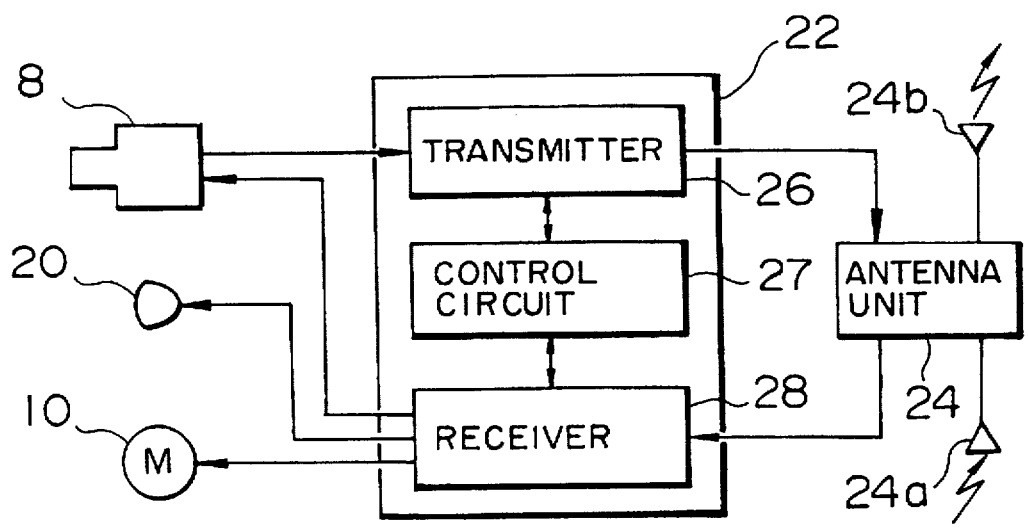
FIG. 4 is a block diagram showing electric components of the intrapipe work robot.

A drive battery 16 is provided below the motor 10 and serves as a power supply for driving the motor 10 and supplying power to other units. A controller 22 is housed above the motor 10. FIG. 4 shows the controller 22. As shown in FIG. 4, the controller 22 is constituted by a transmitter 26, a receiver 28, and a control circuit 27 for controlling the transmitter 26 and the receiver 28. The transmitter 26 is connected to the camera 8, and the receiver 28 is connected to the camera 8, the lights 20, and the motor 10. Through the movable antenna unit 24 connected to the transmitter 26 and the receiver 28, the receiver 28 receives an operation signal from the operation unit 4 and actuates the respective components, e.g., the camera 8, the lights 20, and the motor 10 in accordance with the designation of the operation signal, and the transmitter 26 transmits the image signal photographed by the camera 8 in the form of a radio wave.

Figure 3B:
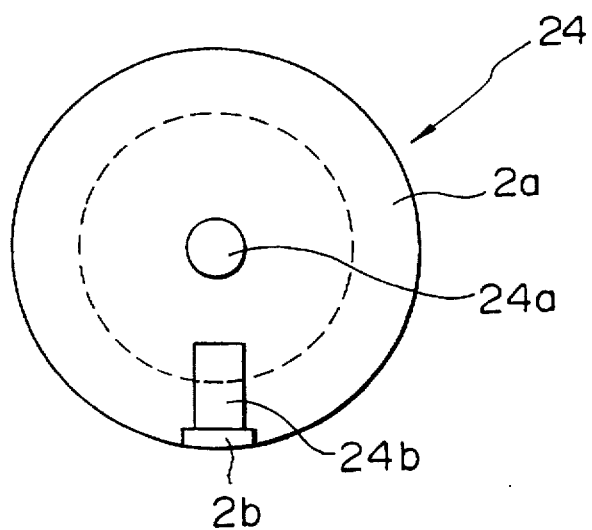
FIG. 3B is a front view of an antenna unit fixedly mounted on the rear end of the intrapipe work robot.

As shown in FIGS. 3A and 3B, the movable antenna unit 24 consists of a circular base 2a having an under stay 2b and turnably connected to the rear end of the robot 2, an antenna 24a mounted horizontally on the base 2a and extending rearwards along the axial direction of the robot 2, and an antenna 24b mounted vertically on the stay 2b.

The antenna 24a is used for receiving a control signal transmitted through the antenna 32a from the operation unit 4 and, on the other hand, the antenna 24b is used for transmitting an image signal fed from the camera 8 toward the antenna 32b.

Further, the antenna unit 24 is adapted such that the center of gravity thereof is positioned under its turning center, so that if the robot 2 is inclined on a left or a right side, a line passing through the turning center and the center of gravity of the antenna unit 24 is always kept to a vertical manner.

A radio wave used for communication between the robot 2 and the operation unit 4 will be described. The following formula is used for obtaining the minimum frequency (cut-off frequency) of the radio wave that can propagate in a pipe, e.g., a gas pipe:

Cut-off frequency (Hz)=Speed of Light (m/sec)/{1.706×diameter of pipe (m)}

Specifically, a radio wave having a frequency less than the cut-off frequency obtained by the above described formula cannot propagate in the pipe having this diameter. According to an actual calculation performed by using this formula, if an evacuated pipe having a diameter of, e.g., 10 cm is used, the speed of light (3.0×108) is substituted in the above formula, thereby obtaining a frequency of 1.758 GHz. It was confirmed from an experiment that even if a radio wave having a frequency less than 1.758 GHz was transmitted in a pipe having a diameter of 10 cm, the radio wave did not propagate well, while a radio wave having a frequency higher than this propagates well. A typical composition of the city gas is 88.5% of methane, 4.6% of ethane, 5.4% of propane, and 1.5% of butane. It was conformed that even when this city gas was sealed in a pipe, if the radio wave had a frequency equal to or more than the value according to the above formula, the radio wave could propagate in the pipe well.

Therefore, by setting up such that a radio wave to be transmitted within the pipe 3 in which the robot 2 has been inserted so as to inspect the inside thereof has a frequency higher than a cut-off frequency corresponding to the pipe 3, while the frequency is less than a cut-off frequency corresponding to branch pipes each having a diameter smaller than that of pipe 3 and connected to the pipe 3 at its one end and connected to gas instruments in a user's home (not shown) at the other end thereof, the radio wave can be well propagated within the pipe 3 and, on the other hand, can not be propagated in the branch pipes. Accordingly, it does not become possible to cause a radio disturbance or a radio interference onto other radio communication instruments such as, for example, a radio set, a TV set, a cordless telephone, etc.

In the next place, the operation of the intrapipe work robot apparatus according to the present invention will be described.

As shown in FIG. 1, the robot 2 is inserted from the end portion of the pipe 3 which is the inspection target, and designation signal is sent from the operation unit 4 by using the command box 34, thereby causing the robot 2 to travel. More specifically, the command box 34 is operated to move the robot 2 forward. When the robot 2 reaches an inspection location, the lights 20 are turned on, and the interior of the pipe 3 is photographed with the camera 8. At this time, when the entire portion of the pipe 3 is to be inspected, the robot 2 is set in the photographing mode from the beginning and caused to travel. An image signal photographed by the camera 8 is fed to the transmitter 26, and converted to a radio wave thereat, and thereafter transmitted to the operation unit 4 through the movable antenna unit 24. The operation unit 4 displays this image with the monitor 38 in order to perform inspection. The operation unit 4 also records the image with the VTR 40 if necessary.

Since the robot 2 receives any designation from the operation unit 4 on the ground by way of the radio wave and can send the photographed image signal to the ground by using the radio wave, a cable need not be accompanied unlike with the conventional intrapipe work robot, and inspection of the interior of the pipe 3 can be performed very simply, easily, and quickly. In addition, the operation is not limited by the weight and length of the cable, and an inspection ranging a very long distance can be executed as far as a radio wave can reach. If the radio wave utilizes the frequency obtained in accordance with the above formula, it can reliably propagate inside the pipe 3. Still further, since the cable need not be supplied or taken up on the ground side, the work can be continued very easily.

In the above-described antenna units 24 and 32, when the robot 2 is inclined from side to side by rolling within the pipe 3, the movable antenna unit 24 is turned in proportion to the inclination of the robot 2 so as to hold the antenna 24b vertical. By this, it becomes possible to ensure the positive communication with a signal between the antenna units 24 and 32 without reducing the antenna effect so far as the antenna 32b of the antenna unit 32 mounted on the side of the operation unit 4 is set vertically.

On the other hand, as to the relationship between the antennae 24a and 32a, they are always held in horizontal. Accordingly, it becomes possible to ensure the positive communication with a signal therebetween.

In addition, according to the present invention, both the antenna units 24 and 32 are constructed as described above, it becomes possible to positively transmit and receive different signals between the robot 2 and the operation unit 4 without causing any radio interference. Therefore, since the control signal for the robot 2, the image signal for inspecting the inside of the pipe 3 and a signal for detecting the robot position can be precisely and positively transmitted and received over a long distance, it becomes possible to extend a travelling distance of the robot 2 in the pipe 3, that is, to extend an inspection distance in the pipe 3, thereby enabling the robot 2 to perform efficiently more precise and positive inspection of the pipe 3.

The above embodiment exemplifies inspection of the interior of a pipe. However, the present invention is not limited to an intrapipe work inspection, but can be applied to repair, removal of a clogged substance, and the like.

A method of measuring the position in the pipe of the robot 2 of the intrapipe work robot apparatus according to the present invention will be described with reference to FIG. 5.

Figure 5:
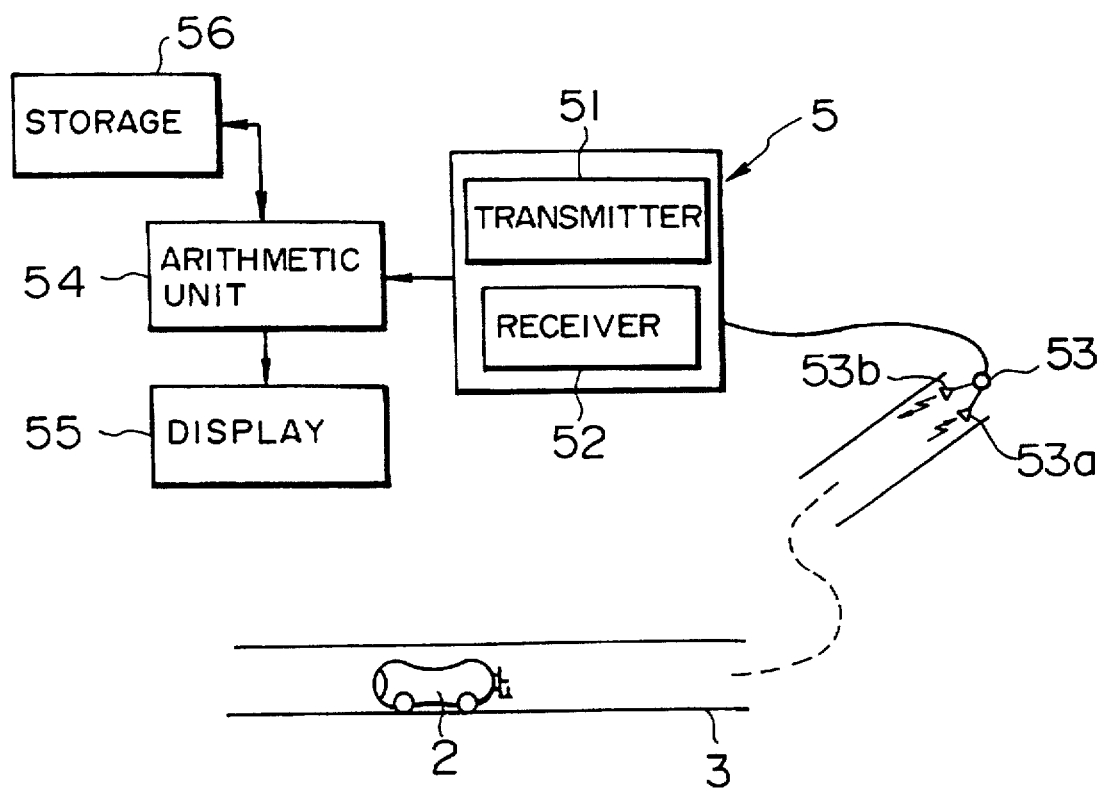
FIG. 5 is a block diagram showing electric components of a measuring unit for practicing a measuring method according to the present invention.

FIG. 5 shows a measuring unit 5 used for this robot position measuring method. The measuring unit 5 is constituted by a transmitter 51, receiver 52, antenna unit 53 connected to the transmitter 51 and the receiver 52, arithmetic unit 54, display 55, storage 56 connected to the arithmetic unit 54, and the like.

As shown in FIG. 6, the antenna unit 53 consists of a pair of antennae 53a and 53b for receiving a robot position detecting signal and transmitting the same, respectively, which are mounted horizontally and oppositely to each other on the stationary antenna unit 32.

The measuring unit 5 transmits a radio wave from the transmitter 51 through the antenna 53b and receives a radio wave, which is reflected by the robot 2, through the antenna 53a by the receiver 52, while the received radio wave is fed to the arithmetic unit 54 as well as the radio wave transmitted from the transmitter 51 to the robot 2. The arithmetic unit 54 detects a time interval between transmission and reception of the radio wave, and substitutes the time interval in a predetermined formula, thereby calculating a distance from the measuring unit 5 to the robot 2. The storage 56 stores in advance the reception result obtained when the robot 2 is not put in the pipe 3. This reception result is used as a comparison target with a radio wave actually reflected by the robot 2. The display 55 displays the distance from the measuring unit 5 to the robot 2 and the like obtained by the arithmetic unit 54. Furthermore, the display 55 can be connected to the monitor 38 of the robot 2 (described above) so that the value of the distance is displayed together with the image of the interior of the pipe photo-graphed by the robot 2.

When the robot 2 photographing the interior of the pipe 3 reaches a location of corrosion or the like and the defective portion is displayed in this manner, a radio wave having the predetermined frequency is transmitted as a pulse from the transmitter 51 of the measuring unit 5 through the antenna unit 53. The radio wave propagates in the pipe 3 to reach the robot 2, and is reflected by the robot 2 to be returned to the antenna unit 53. The reflected radio wave received by the antenna unit 53 is amplified and sent to the arithmetic unit 54. The arithmetic unit 54 performs binarization by setting a signal equal to or exceeding a certain level to 1 and a signal less than the level to 0. The arithmetic unit 54 compares the binary signal with the radio wave transmitted by the transmitter 51 and, if necessary, compares it with information stored in the storage 56, thereby detecting the time elapsed between the transmission and reception of the radio wave. The distance from the antenna unit 53 to the robot 2 is calculated from the lapse time in accordance with a formula: ½(speed of light×measured time)k, and displayed on the display 55. In the above formula, "k" is a correction coefficient.

According to the method of measuring the position of the robot 2 of this embodiment, since the position of the robot 2 working in the pipe 3 is calculated by transmitting a radio wave from the ground and measuring the time required until reception of the radio wave upon reflection by the robot, the position can be measured very accurately. Accordingly, a location where an abnormality has occurred and hence repair is needed can be correctly specified. In addition, since a mechanism for adding the travel distance of the robot 2 is not needed for measurement, the system itself of the robot 2 can be simplified. And further, even when a plurality of measurements are continuously performed at several locations, the measurements are done separately at these locations, so that errors are not accumulated at all. Still further, the measurements can be performed within a very short period of time.

The above embodiment exemplifies a case of a gas pipe. However, the method of measuring the position of the robot 2 according to the present invention is not limited to the gas pipe. The robot 2 is operated in accordance with radio control. However, the present invention is not limited to this, but a cable may be connected to the robot. Even in this case, the position of the robot can be measured very accurately and easily. Furthermore, when the robot is of a radio control type, a position measuring unit may be incorporated in a robot operating unit. Then, the antenna can be shared, thereby further simplifying the system.

According to the method of measuring a position of the robot of the present invention, a radio wave having a predetermined frequency is transmitted into the pipe, and then the radio wave, reflected by the robot provided in the pipe for inspecting the interior of the pipe and returned to the measuring unit, is received, and the time required for a return of the radio wave to the measuring unit is measured, thereby calculating the distance between the measuring unit and the robot. Therefore, the position of the robot can be measured accurately. Accordingly, a location where an abnormality has occurred and thus repair is needed can be correctly specified. Since a mechanism for adding the travel distance is not needed in the robot, the system itself of the robot can be simlified. Even when measurement is continuously performed at several locations, measurement is done separately at the respective locations, so that errors are not accumulated at all. Furthermore, the position of the robot in the pipe to be inspected can be measured within a very short period of time.

What is claimed is:

1. An intrapipe work robot apparatus comprising:
   (a) an intrapipe work robot inserted into a pipe so as to perform a work while performing automotive travelling in the pipe;
   (b) an operation unit for designating travel and other actions of said robot externally of the pipe, in which an operation output signal is transmitted from at least said operation unit to said intrapipe work robot through radio communicating means;
   (c) a movable antenna unit mounted on said intrapipe work robot which includes a circular base having an under stay and connected to a rear end of said intrapipe work robot, a first antenna mounted on said base and horizontally extending rearwards so as to receive an operation signal from said operation unit and a second antenna mounted vertically on said stay so as to transmit an image signal;
   (d) a stationary antenna unit mounted on the ground on the side of said operation unit which includes a first antenna paired with the first antenna of said movable antenna unit so as to transmit the operation signal and mounted horizontally so as to extend forwards, a second antenna paired with the second antenna of said movable antenna unit so as to receive the image signal and mounted vertically; and
   (e) a measuring unit for measuring a position of said intrapipe work robot.

2. An apparatus according to claim 1, wherein said intrapipe work robot comprises:
   (1) a body having an outer diameter with which said body can be inserted into a pipe to be inspected,
   (2) a traveling mechanism that can travel in forward and backward directions,
   (3) photographing means capable of photographing an interior of the pipe to be inspected,
   (4) receiving means for receiving an operation output signal from said operation unit on the ground,
   (5) control means for performing control regarding travel and other actions based on the received operation output signal, and
   (6) transmitting means for transmitting an image photographed by said photographing means to said operation unit.

3. An apparatus according to claim 1, wherein said operation unit comprises a control circuit having input means for designating travel and other actions of said body, transmitting means for transmitting an operation output signal from said control means to said body, and receiving means for receiving the image signal photographed by said photographing means.

4. An apparatus according to claim 1, wherein said circular base of the movable antenna unit is turnably connected to the rear end of said intrapipe work robot, and further a center of gravity of said movable antenna unit is positioned under a turning center of said circular base, so that if said intrapipe work robot is inclined on a left or a right side, a line passing through the turning center and the center of gravity is always kept to a vertical manner.

5. An apparatus according to claim 1, wherein said stationary antenna unit further comprises a pair of antennae mounted horizontally and oppositely to each other thereon so as to transmit and receive a robot detecting signal transmitted with a radio wave.

* * * * *